United States Patent
Lin

(10) Patent No.: US 10,075,317 B2
(45) Date of Patent: Sep. 11, 2018

(54) METHOD AND DEVICE FOR MODULATING COMPLEX SYMBOLS, DEMODULATION METHOD AND DEVICE, AND CORRESPONDING COMPUTER PROGRAMS

(71) Applicant: ORANGE, Paris (FR)

(72) Inventor: Hao Lin, Cesson-Sevigne (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/546,955

(22) PCT Filed: Feb. 1, 2016

(86) PCT No.: PCT/FR2016/050207
§ 371 (c)(1),
(2) Date: Jul. 27, 2017

(87) PCT Pub. No.: WO2016/120577
PCT Pub. Date: Aug. 4, 2016

(65) Prior Publication Data
US 2017/0373895 A1 Dec. 28, 2017

(30) Foreign Application Priority Data
Jan. 30, 2015 (FR) ...................................... 15 50728

(51) Int. Cl.
*H04L 27/26* (2006.01)
(52) U.S. Cl.
CPC .................................. *H04L 27/264* (2013.01)
(58) Field of Classification Search
CPC .................................................... H04L 27/264
See application file for complete search history.

(56) References Cited

U.S. PATENT DOCUMENTS

2004/0125740 A1* 7/2004 Gardner ................... H04B 1/69
370/208
2010/0322322 A1* 12/2010 Kodama .................. H04B 3/54
375/257
(Continued)

FOREIGN PATENT DOCUMENTS

GB          2500679 A   * 10/2013   ........... H04L 5/0007

OTHER PUBLICATIONS

International Search Report and Written Opinion dated Apr. 5, 2016 for International Application No. PCT/FR2016/050207, filed Feb. 1, 2016.
(Continued)

*Primary Examiner* — Freshteh N Aghdam
(74) *Attorney, Agent, or Firm* — David D. Brush; Westman, Champlin & Koehler, P.A.

(57) ABSTRACT

A method of modulating complex symbols is provided, which delivers a multiple carrier signal. The method performs the following acts for at least one base block of N×K complex symbols, where N and K are integers such that N>1 and K≥1: extending the base block to deliver a block of N×(2K−1) elements, referred to as an "extended" block; phase shifting the extended block, delivering a phase shifted extended block; filtering the phase shifted extended block, delivering a block of N×(2K−1) filtered elements, referred to as a "filtered" block; mapping the N×(2K−1) filtered elements of said filtered block onto MK frequency samples, where M is the total number of carriers and M≥N; and transforming the MK frequency samples from the frequency domain to the time domain.

14 Claims, 2 Drawing Sheets

(56) References Cited

U.S. PATENT DOCUMENTS

| | | | |
|---|---|---|---|
| 2015/0349987 A1* | 12/2015 | Soriaga | H04L 25/03834 370/329 |
| 2017/0134203 A1* | 5/2017 | Zhu | H04L 27/2614 |
| 2017/0150429 A1* | 5/2017 | Baldemair | H04W 48/16 |
| 2017/0163456 A1* | 6/2017 | Chen | H04L 27/2602 |
| 2017/0171010 A1* | 6/2017 | Qu | H04L 27/2698 |
| 2017/0257249 A1* | 9/2017 | Hong | H04L 27/2675 |
| 2017/0264476 A1* | 9/2017 | Yang | H04L 5/0066 |

OTHER PUBLICATIONS

Translation of the International Search Report dated Apr. 5, 2016 or International Application No. PCT/FR2016/050207, filed Feb. 1, 2016.
M Bellanger et al: "FBMC Physical Layer: a Primer", May 27, 2010 (May 27, 2010), pp. 1-31, XP055239692.
English translation of the International Written Opinion dated May 31, 2017, for International Application No. PCT/FR2016/050207, filed Feb. 1, 2016.

* cited by examiner

METHOD AND DEVICE FOR MODULATING COMPLEX SYMBOLS, DEMODULATION METHOD AND DEVICE, AND CORRESPONDING COMPUTER PROGRAMS

CROSS-REFERENCE TO RELATED APPLICATIONS

This Application is a Section 371 National Stage Application of International Application No. PCT/FR2016/050207, filed Feb. 1, 2016, which is incorporated by reference in its entirety and published as WO 2016/120577 on Aug. 4, 2016, not in English.

1. FIELD OF THE INVENTION

The field the invention is that of communications making use of multi-carrier modulation.

More precisely, the invention relates to a novel technique for modulation on a multiplex of carriers, referred to below as filter bank orthogonal frequency division multiplexing (FB-OFDM), and it also relates to a corresponding technique for demodulation.

The invention finds applications in particular in the field of communications that are wireless (DAB, DVB(-T, T2, H, NGH), WiFi, WiMAX, WLAN, non-guided optics, etc.) or wired (xDSL, PLC, optics, etc.) making use of multi-carrier modulation.

In particular, the invention finds applications in the field of cellular communications, on the uplink or on the downlink, e.g. in LTE/LTE-A systems or future generation systems (5G, etc).

2. PRIOR ART

Several techniques are known for generating multiple carrier signals.

Among those techniques, OFDM type modulations are known that make it possible to generate a multiple carrier signal from complex symbols, as are filter-bank multicarrier (FBMC) type modulations that enable a multiple carrier signal to be generated from real symbols.

The main techniques used for generating an FBMC type multi-carrier signal are frequency sampling FBMC (FS-FBMC) and polyphase network FBMC (PPN-FBMC). These various techniques are described in particular in the document "FBMC physical layer: a primer", M. Bellanger, PHYDYAS, June 2010.

FS-FBMC and PPN-FBMC are promising techniques for generating multiple carrier signals since they make it possible to obtain a signal presenting a spectrum of that is well localized in the time domain and in the frequency domain, while avoiding inserting a guard interval, as is needed in OFDM.

Nevertheless, they suffer from several drawbacks, in particular in terms of complexity (quantity of calculation) and of compatibility with other signal processing techniques conventionally used in OFDM (such as for example space/time coding, channel estimation, equalization, etc.).

There therefore exists a need for a novel technique for multiple carrier modulation that does not present all of the drawbacks of the prior art.

3. SUMMARY OF THE INVENTION

The invention proposes a novel solution in the form of a method of modulating complex signals, delivering a multiple carrier signal.

According to the invention, such a method performs the following steps for at least one base block of N×K complex symbols, where N and K are integers such that N>1 and K≥1:

extending said base block to deliver a block of N×(2K−1) elements, referred to as a an "extended" block, comprising:
  if K is odd: a column comprising N elements corresponding to N first complex symbols of said base block, referred to as a "reference" column; and 2K−2 columns comprising N(2K−2) elements, of which N(K−1) elements correspond to the remaining NK−N complex symbols of the base block, and N(K−1) elements correspond to the conjugates of said remaining NK−N complex symbols of the base block;
  if K is even: a column comprising N elements corresponding to N first complex symbols of said base block, referred to as a "reference" column; two columns comprising 2N elements, of which N elements correspond to the real parts of N second complex symbols of the base block, distinct from the N first complex symbols; and N elements correspond to the imaginary parts of the N second complex symbols; and 2K−4 columns comprising N(2K−4) elements, of which N(K−2) elements correspond to the remaining NK−2N complex symbols of the base block and N(K−2) elements correspond to the conjugates of the remaining NK−2N complex symbols of the base block;
phase shifting the extended block, delivering a phase shifted extended block;
filtering the phase shifted extended block, delivering a block of N×(2K−1) filtered elements, referred to as a "filtered" block;
mapping the N×(2K−1) filtered elements of the filtered block on MK frequency samples, where M is the total number of carriers and M≥N; and
transforming said MK frequency samples from the frequency domain to the time domain, delivering said multiple carrier signal.

The complex symbols form part of a communications signal and they are associated with one or more data applications (possibly of different kinds: audio, video, text, etc.) that require a signal to be transmitted between two entities for processing the signal.

The invention thus proposes a novel solution for generating a multiple carrier signal from at least one block of complex symbols, offering several advantages compared with prior art modulation of the FBMC or OFDM type.

In particular, the proposed modulation technique presents reduced complexity compared with prior art FBMC type modulation.

In particular, the proposed modulation technique relies on generating a multiple carrier signal from complex symbols, like modulation of the OFDM type, whereas modulation of the FBMC type relies on generating a multiple carrier signal from real symbols.

As a result of using real symbols at the input to an FBMC modulator, it is necessary to have an overlap between at least two multicarrier symbols after the inverse Fourier transform operations, whereas such overlap between multicarrier symbols is not necessary for modulation of the OFDM type or of the invention.

As a result, it is possible to use the signal processing techniques conventionally used in the context of OFDM modulation, such as MIMO coding, peak-to-average power ratio (PAPR) reduction, channel estimation techniques, equalizing techniques, etc., with a modulation technique of the invention. The proposed modulation technique is thus compatible with other signal processing techniques conventionally used with OFDM.

The inventor has shown that using real value symbols at the input to the modulator (obtained by separating the real and imaginary parts of each complex symbol) is not a necessary condition for perfect reconstruction of the symbols ($C_{N \times K} = \hat{C}_{N \times K}$). The inventor has shown that by using a specific symbol pattern, it is possible to use complex value symbols as input to the modulator and to satisfy the conditions for perfect reconstruction of the symbols.

The invention thus proposes a novel technique of repeating/distributing complex symbols, which is performed during a step of extending a base block of complex symbols, making it possible to obtain an extended block that defines a specific pattern. It should be observed that such complex symbols may be data symbols, possibly presenting a zero value, or they may be pilots. Optionally, the imaginary parts of some of the complex symbols may be of zero value.

The invention also makes it possible to simplify the operation of building up frames, since it makes it possible to modulate blocks of complex symbols, unlike FBMC.

Compared with modulation of the OFDM type, the proposed modulation technique generates a signal that is better localized in frequency and that presents better spectrum efficiency. It is also more robust than OFDM modulation when synchronization is not perfect. Also, the proposed modulation technique leads to symbol diversity, as a result of using complex symbols and their conjugates as a result of extending the base block, which does not apply to OFDM type modulation.

It should be observed that the rows and the columns of the base block may be permutated prior to extension. Likewise, some of the rows or columns of the extended block may optionally be permutated after extension.

In a particular implementation of the invention, the modulation method also uses interleaving of the frequency samples obtained at the output from the mapping step, prior to the step of transforming from the frequency domain to the time domain.

Such interleaving makes it possible in particular to take advantage of the diversity generated by the extension step, by increasing the distance between a complex symbol and its conjugate.

In particular, it should be observed that such interleaving modifies the positions of the frequency samples obtained from complex symbols of the data symbol type, but does not modify the positions of zero value frequency samples or the positions of frequency samples obtained from complex symbols of the pilot type, if any (because the positions of pilots need to be known to the demodulator).

Interleaving is thus applied on (N×K+(K−1)−T) frequency samples, where N×K+(K−1) corresponds to the number of nonzero frequency samples, and T corresponds to the number of frequency samples obtained from pilots.

In a particular implementation of the invention, the extending step performs the following sub-steps:
  randomly selecting the first N complex symbols of the base block, and allocating them to the reference column, corresponding to the central column of the extended block;
  if K is odd:
    determining the conjugates of the remaining N(K−1) complex symbols of the base block;
    allocating a first half of the remaining N(K−1) complex symbols and their respective conjugates to (K−1) columns to the left of the reference column, with a symmetrical relationship between the remaining complex symbols and their respective conjugates; and
    allocating a second half of the remaining N(K−1) complex symbols and their respective conjugates to (K−1) columns to the right of the reference column, with a symmetrical relationship between the remaining complex symbols and their respective conjugates;
  if K is even:
    randomly selecting the N second complex symbols of the base block;
    determining the real parts and the imaginary parts of the N second complex symbols;
    allocating one of the real or imaginary parts of each of the N second complex symbols to a central column from among the columns to the left of the reference column of the extended block, referred to as the "left central" column;
    allocating the other one of the real or imaginary parts of each of the N second complex symbols to a central column from among the columns to the right of the reference column of the extended block, referred to as the "right central" column;
    determining the conjugates of the remaining N(K−2) complex symbols of the base block;
    allocating a first half of the remaining N(K−2) complex symbols and their respective conjugates to columns to the left of said reference column, with a symmetrical relationship between the remaining complex symbols and their respective conjugates relative to the left central column; and
    allocating a second half of the remaining N(K−2) complex symbols and their respective conjugates to columns to the right of the reference column, with a symmetrical relationship between the remaining complex symbols and their respective conjugates relative to the right central column.

In this particular implementation of the invention, an extended block is constructed from the complex symbols of the base block and their conjugates, and if K is even, from the real portion and the imaginary portion of N complex symbols of the base block.

The extended block always has an odd number (2K−1) of columns.

For example, N complex symbols selected randomly from the NK complex symbols of the base block are allocated to the central column of the extended block.

If K is odd, then a first half of the remaining NK−N complex symbols of the base block (i.e. the symbols not allocated to the central column of the extended block) and their respective conjugates are allocated to the K−1 columns to the left of the central column. Each of the complex symbols and their conjugates are placed in such a manner as to maintain a symmetrical relationship relative to an axis of symmetry located in the middle of the K−1 columns to the left of the central column. In the same manner, a second half of the remaining NK−N complex symbols of the base block (i.e. the symbols not allocated to the central column of the extended block) and their respective conjugates are allocated to the K−1 columns to the right of the central column. Each of the complex symbols and their conjugates are placed in such a manner as to maintain a symmetrical relationship relative to an axis of symmetry located in the middle of the K−1 columns to the right of the central column.

If K is even, N complex symbols are selected randomly from the NK−N complex symbols of the base block that are not allocated to the central column. The real and imaginary parts of these N complex symbols are then determined and allocated randomly to the column situated in the middle of the K−1 columns of the left of the central column, referred to as the left central column, and to the column situated in the middle of the K−1 columns to the right of the central column, referred to as the right central column. A first half of the remaining NK−2N complex symbols of the base block (i.e. symbols not allocated to the central column or to the left and right central columns of the extended block) together with their respective conjugates are allocated to the columns to the left of the central column, apart from the left central column. Each of the complex symbols and their conjugates are placed in such a manner as to maintain a symmetrical relationship relative to the left central column. In the same manner, A second half of the remaining NK−2N complex symbols of the base block (i.e. symbols not allocated to the central column or to the left and right central columns of the extended block) together with their respective conjugates are allocated to the columns to the right of the central column, apart from the right central column. Each of the complex symbols and their conjugates are placed in such a manner as to maintain a symmetrical relationship relative to the right central column.

It should be observed that the way in which the extended block is constructed is not limited to the particular implementation described above. For example, if K is even, it is possible to decide to begin by allocating N complex symbols of the base block to a central column of the extended block, and then NK−2N complex symbols to the columns to the left of the central column, apart from the left central column, and NK−2N complex symbols of the columns of the right of the central column, apart from the right central column, followed by determining the real and imaginary parts of the remaining N complex symbols in order to allocate them to the left and right central columns.

Whatever way in which the extended block is constructed, this particular implementation seeks to obtain an extended block that defines a specific pattern, such that:

if K is odd, the central column of the extended block comprises N complex symbols, the columns to the left of the central column comprise $$\frac{NK - N}{2}$$

complex symbols and their respective conjugates, while complying with a symmetry relationship relative to a vertical axis of symmetry placed in the middle of the columns are to the left of the central column, and the columns of the right of the central column comprise $$\frac{NK - N}{2}$$

complex symbols together with their respective conjugates, while complying with a symmetry relationship relative to a vertical axis of symmetry placed in the middle of the columns of the right of the central column, each complex symbol of the base block appearing only once in the extended block;

if K is odd, the central column of the extended block comprises N complex symbols, the left and right central columns comprise the real or imaginary parts of N complex symbols, the columns to the left of the central column, apart from the left central column, comprise $$\frac{NK - 2N}{2}$$

complex symbols and their respective conjugates, while complying with a symmetry relationship relative to the left central column, and the columns of the right of the central column, apart from the right central column, comprise $$\frac{NK - 2N}{2}$$

complex symbols and their respective conjugates, while complying with a symmetry relationship relative to the right central column, each complex symbol of the base block appearing once only in the extended block, unless it is broken up into its real part and its imaginary part.

In particular, the columns of the extended block as constructed in this way may be permutated. As a result, after permutation, the reference column is not necessarily the central column of the extended block.

According to a specific characteristic of the invention, if K is odd or if K is even and consideration is not given to the left central column or to the right central column, each row of the extended block is made up of an alternation of non-conjugate complex symbols and of conjugate complex symbols.

In a particular implementation of the invention, the phase shifting step performs a phase shift row by row of the extended block, while multiplying elements of an $(n+1)^{th}$ row of the extended block, with the exception of the element corresponding to the reference column, by a value equal to $(\sqrt{-1})^n$, where n lies in the range 0 to N−1, with the exception of the element corresponding to the reference column, which is multiplied by 1.

For example, the phase shifted extended block $C_{N \times (2K-1)}^E$ is obtained from the following equations:

$$C_{N \times (2K-1)}^E = J_{N \times (2K-1)} \odot \overline{C}_{N \times (2K-1)}^E$$

with:

$$J_{N \times 2K-1} = \begin{bmatrix} j_{1 \times 2K-1}^0 \\ \vdots \\ j_{1 \times 2K-1}^{N-1} \end{bmatrix}$$

if K is even:

$$\overline{C}^E_{N\times 2K-1} = \begin{cases} \overline{C}^E_{n,k} = (\overline{C}^E_{n,K-k})^* = C_{n,k}, k \in [0, (K/2)-2] \\ \overline{C}^E_{n,(K/2)-1} = \sqrt{2}\,\Re\{C_{n,(K/2)-1}\} \\ \overline{C}^E_{n,(K/2)-1+K} = \sqrt{2}\,\Im\{C_{n,(K/2)-1}\} \\ \overline{C}^E_{n,K-1} = C_{n,K/2} \\ \overline{C}^E_{n,k+K} = (\overline{C}^E_{n,2K-1-k})^* = C_{n,k+K/2+1}, k \in [0, (K/2)-2] \end{cases}$$

if K is odd:

$$\overline{C}^E_{N\times 2K-1} = \begin{cases} \overline{C}^E_{n,k} = (\overline{C}^E_{n,K-k})^* = C_{n,k}, k \in [0, (K-1)/2-1] \\ \overline{C}^E_{n,K-1} = C_{n,(K-1)/2} \\ \overline{C}^E_{n,k+K} = (\overline{C}^E_{n,2K-1-k})^* = C_{n,k+(K-1)/2+1}, k \in [0, (K-1)/2-1] \end{cases}$$

$C_{N\times K}=[C_{n,k}]_{n=0,\ldots,N-1\ and\ k=0,\ldots,K-1}$ is said base block;
n is an integer lying in the range 0 to N-1;
k is an integer lying in the range 0 to K-1;
* is the conjugate operator;
⊙ is the Hadamard product; and
$j_{1\times(2K-1)}^n$ is a vector in which all of the elements are equal to $(\sqrt{-1})^n$, with the exception of the element having the same index as the reference column, which element is equal to 1.

In particular, if the columns are interleaved randomly before the extension step, and the phase shifted extended block is obtained from the same equations, but in a different order.

According to a particular characteristic of the invention, the filtering step makes use of a filter of length 2K-1, such that the value of the filter coefficient of the same index as the reference column, referred to as the "reference" coefficient, is equal to 1, and the values of the other coefficients of the filter are symmetrical relative to the reference coefficient.

In particular, all of the coefficients of the filter have a value that is real.

Thus, in the absence of permutations, if the reference column is the central column of the extended block, the filter presents a central coefficient equal to 1, and the values of the other coefficients are symmetrical relative to the central coefficient. For example, for K=4, the seven coefficients of the filter are respectively $h_3^f, h_2^f, h_1^f, 1, h_1^f, h_2^f,$ and $h_3^f$.

Such symmetry serves in particular to obtain a signal that is well localized in frequency.

In particular, the coefficients $h_k^f$ of the filter may be calculated so as to comply with Nyquist's criterion, such that:

$$h_k^f = \begin{cases} (h_0^f)^2 = 1 \\ (h_k^f)^2 + (h_{K-k}^f)^2 = 1, \text{ for } k \in [1, K-1] \end{cases}$$

In an implementation, for each row of the filtered block, the mapping step performs both a cyclic shift modulo MK, enabling the element belonging to the reference column to be brought into the $([(n+m)\ K \bmod MK]+1)^{th}$ position, where m is the index of the first carrier allocated to a given user, for m lying in the range 0 to M-N-1, and n is the index of the row lying in the range 0 to (N-1), and sums the elements obtained after cyclic shifting column by column.

In particular, if m=0, for each row of the filtered block, the mapping step performs cyclic shifting by nK positions modulo MK and also sums the elements obtained after the cyclic shifting column by column.

According to another particular characteristic of the invention, when N<M, a zero value is given to the first element of each column of the extended block preceding the reference column, or indeed a zero value is given to the last element of each column of the extended block following the reference column.

This avoids problems of spectrum overlap, when the band (having M carriers) is shared between a plurality of users, each being allocated N carriers.

In this particular circumstance, if interleaving is performed between the steps of mapping and transforming from the frequency domain to the time domain, the interleaving is applied on (N×K-T) frequency samples, where N×K corresponds to the number of nonzero frequency samples and T corresponds to the number of frequency samples obtained from pilots. Furthermore, in this particular situation, it is not possible to interleave frequency samples obtained from complex symbols coming from and/or going to distinct users.

In a particular implementation, K is strictly greater than 1.

In another implementation, the invention relates to a device for modulating complex symbols, delivering a multiple carrier signal and comprising the following modules, that are activated for at least one block of N×K complex symbols, referred to as a "base" block, where N and K are integers such that N>1 and K≥1:

an extension module for extending the base block to deliver a block of N×(2K-1) elements, referred to as an "extended" block, comprising:
  if K is odd:
    a column comprising N elements corresponding to N first complex symbols of said base block, referred to as a "reference" column;
    2K-2 columns comprising N(2K-2) elements, of which N(K-1) elements correspond to the remaining NK-N complex symbols of the base block and N(K-1) elements correspond to the conjugates of the remaining NK-N complex symbols of the base block
  if K is even:
    a column comprising N elements corresponding to N first complex symbols of said base block, referred to as a "reference" column;
    two columns comprising 2N elements, of which N elements correspond to the real parts of the N second complex symbols of the base block, distinct from the N first complex symbols, and N elements correspond to the imaginary parts of the N second complex symbols;
    2K-4 columns comprising N(2K-4) elements, of which N(K-2) elements correspond to the remaining NK-2N complex symbols of the base block and N(K-2) elements correspond to the conjugates of the remaining NK-2N complex symbols of the base block
a phase shifter module for phase shifting the extended block, delivering a phase shifted extended block;
a filter module for filtering the phase shifted extended block, delivering a block of N×(2K-1) filtered elements, referred to as a "filtered" block;
a mapping module for mapping the N×(2K-1) filtered elements of the filtered block on MK frequency samples, where M is the total number of carriers and M≥N; and transforming said MK frequency samples from the frequency domain to the time domain, delivering the multiple carrier signal.

Such a modulator device is adapted in particular to perform of the above described modulation method. By way of example, it may be a base station of a cellular network for downlink communication, or a terminal of computer, telephone, tablet, or set-top box, etc. type, for uplink communication. The device may naturally include the various characteristics relating to the modulation method of the invention, which may be combined or taken in isolation. Thus, the characteristics and advantages of the device are the same as those of the above-described method. Consequently, they are not described in greater detail.

The invention also relates to a demodulation method for demodulating a multiple carrier signal, delivering at least one block of reconstructed complex symbols, and performing the following steps:

transforming the multiple carrier signal from the time domain to the frequency domain, delivering MK frequency samples, where M and K are integers such that M>1 and K≥1;

mapping the MK frequency samples on a block of N×(2K−1) elements, where N is an integer such that M≥N>1, referred to as a "demapped" block;

filtering the demapped block, delivering a block of N×(2K−1) filtered elements, referred to as a "filtered" block;

dephase-shifting the filtered block, delivering a block referred to as a "dephase-shifted filtered" block; and reconstructing a base block from the dephase-shifted filtered block, delivering a block of N×K reconstructed complex symbols, referred to as a "reconstructed" block, by:

if K is odd: identifying a reference column of the N first elements in the dephase-shifted filtered block, delivering N first reconstructed complex symbols, and for the remaining N×(2K−1)−N elements of the dephase-shifted filtered block, summing elements of a row of the dephase-shifted filtered block in pairs with the conjugates of respective other elements of the row, delivering $$\frac{N \times (2K-1) - N}{2}$$

reconstructed complex symbols;

if K is even: identifying a reference column of N first elements in the dephase-shifted filtered block, delivering N first reconstructed complex symbols, for 2N second elements of the dephase-shifted filtered block, summing real parts of the 2N second elements in pairs delivering N second reconstructed complex symbols, and for the remaining N×(2K−1)−3N elements of the dephase-shifted filtered block, summing elements of a row of the dephase-shifted filtered block in pairs with the conjugates of respective other elements of the row, delivering $$\frac{N \times (2K-1) - 3N}{2}$$

reconstructed complex symbols.

The invention thus proposes a novel technique for performing demodulation of a multiple carrier signal, enabling at least one block of complex symbols to be reconstructed.

As mentioned above, the proposed solution offers reduced complexity and better compatibility with existing signal processing modules compared with prior art techniques of the FBMC type.

In particular, such a demodulation method is adapted in particular to demodulating a multiple carrier signal transmitted using the above-described modulation method. The operations of transforming from the time domain to the frequency domain, of mapping, of filtering, of phase shifting, and of reconstructing a base block thus involve operations that are the duals of the operations of extending, of phase shifting, of filtering, or mapping, and of transforming from the frequency domain to the time domain as performed at the modulation end.

The characteristics and advantages of the demodulation method are the same as those of the modulation method. Consequently, they are not described in greater detail.

In a particular implementation of the invention, the modulation method also uses interleaving of the frequency samples obtained at the output from the step of transforming from the time domain to the frequency domain, prior to the mapping step.

Such deinterleaving performs an operation that is the inverse of interleaving performed at the modulation end. It serves in particular to put the frequency samples back into order.

Once more, it should be observed that such interleaving modifies the positions of frequency samples that are obtained from the data symbols, and not the positions of frequency samples of zero value or the positions of frequency samples that are obtained from pilots.

For example, the reconstructed block $\hat{C}_{N \times K}$ is obtained from the following equations:

if K is odd:

$$\hat{C}_{n,k} = \begin{cases} \hat{C}_{n,k} = \tilde{C}_{n,k} + \tilde{C}_{n,K-k}^*, k \in [0, (K/2)-2] \\ \hat{C}_{n,(K/2)-1} = \sqrt{2}\left(\Re\{\tilde{C}_{n,(K/2)-1}\} + j\Re\{\tilde{C}_{m,(K/2)-1+K}\}\right) \\ \hat{C}_{n,K/2} = \tilde{C}_{n,K-1} \\ \hat{C}_{n,k+K/2+1} = \tilde{C}_{n,k+K} + (\tilde{C}_{n,2K-1-k})*k \in [0, (K/2)-2] \end{cases}$$

if K is even:

$$\hat{C}_{n,k} = \begin{cases} \hat{C}_{n,k} = \tilde{C}_{n,k} + \tilde{C}_{n,K-k}^*, k \in [0, (K-1)/2-1] \\ \hat{C}_{n,(K-1)/2} = \tilde{C}_{n,K-1} \\ \hat{C}_{n,k+(K-1)/2+1} = \tilde{C}_{n,k+K} + (\tilde{C}_{n,2K-1-k})* \cdot k \in [0, (K-1)/2-1] \end{cases}$$

with:

$$\tilde{C}_{N \times (2K-1)} = J_{N \times (2K-1)}^* \odot \hat{C}_{N \times (2K-1)}^E$$

$$J_{N \times 2K-1} = \begin{bmatrix} j_{1 \times 2K-1}^0 \\ \vdots \\ j_{1 \times 2K-1}^{N-1} \end{bmatrix}$$

$\hat{C}_{N \times (2K-1)}^E$ is the filtered block;
$\tilde{C}_{N \times (2K-1)} = [\tilde{C}_{n,l}]_{n=0, \ldots, N-1 \text{ and } l=0, \ldots, 2K-1}$
$\hat{C}_{N \times K} = [\hat{C}_{n,k}]_{n=0, \ldots, N-1 \text{ and } k=0, \ldots, K-1}$ n is an integer lying in the range 0 to N−1;
k is an integer lying in the range 0 to K−1;
* is the conjugate operator;
⊙ is the Hadamard product; and
$j_{1\times(2K-1)}{}^n$ is a vector in which all of the elements are equal to $(\sqrt{-1})^n$, with the exception of the element having the same index as the reference column, which element is equal to 1.

According to a particular characteristic of the invention, in order to construct each $(n+1)^{th}$ row of the demapped block, the mapping step extracts (2K−1) frequency samples from the MK frequency samples, from the $([(m+n)K-(K-1)] \bmod MK)+1)^{th}$ frequency sample, where m is the index of the first carrier allocated to a given user.

According to another particular characteristic of the invention, the filtering step makes use of a filter of length 2K−1, such that the value of the filter coefficient of the same index as the reference column, referred to as the "reference" coefficient, is equal to 1, and the values of the other coefficients of the filter are symmetrical relative to the reference coefficient.

In particular, such a filter may be identical to the filter used at the modulation end.

In another embodiment, the invention also provides a demodulation device for demodulating a multiple carrier signal, the device delivering at least one block of reconstructed complex symbols, and comprising the following modules:
  a transformation module for transforming the multiple carrier signal from the time domain to the frequency domain, delivering MK frequency samples, where M and K are integers such that M>1 and K≥1;
  a mapping module for mapping the MK frequency samples on a block of N×(2K−1) elements, where N is an integer such that M≥N>1, referred to as a "demapped" block;
  a filter module for filtering the demapped block, delivering a block of N×(2K−1) filtered elements, referred to as a "filtered" block;
  a dephase shifting module for dephase-shifting the filtered block, delivering a block referred to as a "dephase-shifted filtered" block; and
  a reconstruction module for reconstructing a base block from said dephase-shifted filtered block, delivering a block of N×K reconstructed complex symbols, referred to as a "reconstructed" block, by:
    if K is odd: identifying a reference column of the N first elements in the dephase-shifted filtered block, delivering N first reconstructed complex symbols, and for the remaining N×(2K−1)−N elements of the dephase-shifted filtered block, summing elements of a row of the dephase-shifted filtered block in pairs with the conjugates of respective other elements of the row, delivering $$\frac{N\times(2K-1)-N}{2}$$

reconstructed complex symbols;
    if K is even: identifying a reference column of N first elements in the dephase-shifted filtered block, delivering N first reconstructed complex symbols, for 2N second elements of the dephase-shifted filtered block, summing real parts of the 2N second elements in pairs delivering N second reconstructed complex symbols, and for the remaining N×(2K−1)−3N elements of the dephase-shifted filtered block, summing elements of a row of the dephase-shifted filtered block in pairs with the conjugates of respective other elements of the row, delivering $$\frac{N\times(2K-1)-3N}{2}$$

reconstructed complex symbols.

Such a modulator device is adapted in particular to perform of the above described demodulation method. By way of example, it may be a base station of a cellular network for uplink communication, or a terminal of computer, telephone, tablet, or set-top box, etc. type, for downlink communication. The device may naturally include the various characteristics relating to the demodulation method of the invention, which may be combined or taken in isolation. Thus, the characteristics and advantages of the device are the same as those of the above-described method. Consequently, they are not described in greater detail.

The invention also provides one or more computer programs including instructions for performing a modulation method as described above when the program(s) is/are executed by a processor, and one or more computer programs including instructions for performing a demodulation method as described above when the program(s) is/are executed by a processor.

The methods of the invention may thus be performed in various ways, in particular in hard-wired form and/or in software form.

The invention also provides one or more computer readable data media including instructions of one or more computer programs as mentioned above.

4. LIST OF FIGURES

Other characteristics and advantages of the invention appear more clearly on reading the following description of a particular implementation given merely by way of illustrative and nonlimiting example, and from the accompanying drawings, in which.

5. DETAILED DESCRIPTION OF AN IMPLEMENTATION OF THE INVENTION

The general principle of the invention relates both to a new technique for modulation on a multiplex of carriers, involving extending at least one block of complex symbols that are to be modulated, and delivering an extended block defining a specific pattern of symbols, and also to a corresponding new demodulation technique.

Specifically, using such a specific symbol pattern makes it possible to use symbols of complex-value at the input to the modulator and to satisfy the following condition for perfect reconstruction of the symbols: $(C_{N \times K} = \hat{C}_{N \times K})$.

Figure 1:
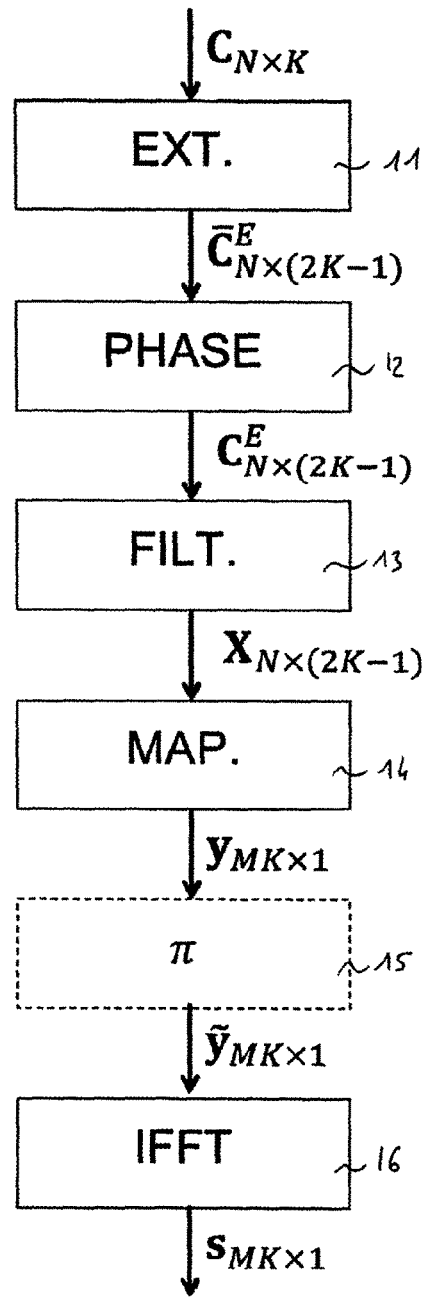
FIG. 1 shows the main steps performed by the modulation technique in a particular implementation of the invention.

With reference to FIG. 1, there follows a description of the main steps performed by a modulation method in an implementation of the invention.

Such a method receives as input at least one base block of N×K complex symbols, written $C_{N \times K}$, with N>1 and K≥1, that it is desired to modulate.

The following notation is used $$C_{N \times K} = \begin{bmatrix} C_{0,0} & \cdots & C_{0,K-1} \\ M & O & M \\ C_{N-1,0} & \cdots & C_{N-1,K-1} \end{bmatrix}.$$

Each complex symbol is written $C_{n,k}$, with k being the index of the complex symbol in the symbol duration (i.e. of the core of the block), for 0≤k≤K−1, and n being the index of the subcarrier (i.e. of the row of the block), for 0≤n≤N−1. It should be observed that a complex symbol may be a data symbol, possibly having a zero value, or it may be a pilot.

The total number of available carriers is written M, with M≥N and with M being an even integer.

Consideration is given to a cellular communication system involving a plurality of users, N<M, with N being the number of carriers allocated to a user. For example, N is a multiple of 12.

During a first step 11, the base block $C_{N \times K}$ is extended so as to obtain an extended block $\overline{C}_{N \times (K-1)}^E$ comprising N×(2K−1) elements. The number of columns is thus increased compared with the number of columns in the base block.

The elements forming the extended block are obtained from the complex symbols of the base block. Each element of the extended block corresponds either to a complex symbol of the base block, or to the conjugate of a complex symbol of the base block, or to the real or the imaginary part of a complex symbol of the base block (possibly multiplied by a factor of $\sqrt{2}$).

Thus, if K is odd, the extended block $\overline{C}_{N \times (K-1)}^E$ comprises a column having N elements corresponding to N first complex symbols selected randomly from the base block, referred to as the "reference" column, and 2K−2 columns comprising N(2K−2) elements, of which N(K−1) elements correspond to the NK−N complex symbols remaining from the base block, and N(K−1) elements correspond to the conjugates of the NK−N complex symbols remaining of the base block.

If K is even, the extended block $\overline{C}_{N \times (K-1)}^E$ comprises a column comprising N elements corresponding to N first complex symbols selected randomly from the base block, referred to as the "reference" column, two columns comprising 2N elements, of which N elements correspond to the real portions of N second complex symbols of said base block that are distinct from the N first complex symbols, and N elements correspond to the imaginary portions of the N second complex symbols, and 2K−4 columns comprise N(2K−4) elements, of which N(K−2) elements correspond to the NK−2N remaining complex symbols of the base block and N(K−2) elements correspond to the conjugates of the NK−2N remaining complex symbols of the base block.

In a particular implementation of the invention, the reference column is the central column of the extended block. It is also possible to apply a permutation to the columns (and/or to the rows), so that the reference column does not correspond to the central column of the extended block.

As examples, and with the reference column as the central column:

if N is equal to 3 and K is equal to 2, the base block:

| a1 | b1 |
|----|----|
| a2 | b2 |
| a3 | b3 | may be extended in the following form:

| Im(a2) | a1 | Im(b1) |
|--------|----|--------|
| Im(a3) | b3 | Re(a2) |
| Re(a3) | b2 | Re(b1) | if N is equal to 3 and K is equal to 3, the base block:

| a1 | b1 | c1 |
|----|----|----|
| a2 | b2 | c2 |
| a3 | b3 | c3 | may be extended in the following form:

| a1  | a1* | a2 | a3  | a3* |
|-----|-----|----|-----|-----|
| b1  | b1* | b2 | c2* | c2  |
| b3* | b3  | c1 | c3  | c3* | if N is equal to 3 and K is equal to 4, the base block:

| a1 | b1 | c1 | d1 |
|----|----|----|----|
| a2 | b2 | c2 | d2 |
| a3 | b3 | c3 | d3 | may be extended in the following form:

| b1  | Re(b2) | b1* | a1 | a3* | Re(c2) | a3  |
|-----|--------|-----|----|-----|--------|-----|
| a2  | Im(b2) | a2* | b3 | d2  | Re(c3) | d2* |
| c1* | Im(c2) | c1  | d1 | d3  | Im(c3) | d3* | if N is equal to 3 and K is equal to 5, the base block:

| a1 | b1 | c1 | d1 | e1 |
|----|----|----|----|----|
| a2 | b2 | c2 | d2 | e2 |
| a3 | b3 | c3 | d3 | e3 | may be extended in the following form:

| b1  | a2* | a2  | b1* | b2 | d2  | b3  | b3* | d2* |
|-----|-----|-----|-----|----|-----|-----|-----|-----|
| a1* | d3* | d3  | a1  | a3 | c1  | c2* | c2  | c1* |
| c3* | d1  | d1* | c3  | e2 | e1* | e3* | e3  | e1  | etc.

In more general manner, the extended block $\overline{C}_{N \times (K-1)}^E$ can be obtained from the following equations:

if K is even:

$$\overline{C}_{N\times 2K-1}^E = \begin{cases} \overline{C}_{n,k}^E = (\overline{C}_{n,K-k}^E)^* = C_{n,k}, k \in [0, (K/2)-2] \\ \overline{C}_{n,(K/2)-1}^E = \sqrt{2}\,\Re\{C_{n,(K/2)-1}\} \\ \overline{C}_{n,(K/2)-1+K}^E = \sqrt{2}\,\Im\{C_{n,(K/2)-1}\} \\ \overline{C}_{n,K-1}^E = C_{n,K/2} \\ \overline{C}_{n,k+K}^E = (\overline{C}_{n,2K-1-k}^E)^* = C_{n,k+K/2+1}, k \in [0, (K/2)-2] \end{cases}$$

if K is odd:

$$\overline{C}_{N\times 2K-1}^E = \begin{cases} \overline{C}_{n,k}^E = (\overline{C}_{n,K-k}^E)^* = C_{n,k}, k \in [0, (K-1)/2-1] \\ \overline{C}_{n,K-1}^E = C_{n,(K-1)/2} \\ \overline{C}_{n,k+K}^E = (\overline{C}_{n,2K-1-k}^E)^* = C_{n,k+(K-1)/2+1}, k \in [0, (K-1)/2-1] \end{cases}$$

It should be observed that multiplying by the term in $\sqrt{2}$ for the real and imaginary parts serves to normalize the amplitudes of symbols in the various columns.

During a second step 12, the extended block $\overline{C}_{N\times(K-1)}^E$ is phase shifted, applying a different phase shift row by row. By way of example, such phase shifting implements multiplying all of the elements of a row of the extended block by a value equal to $(\sqrt{-1})^n$, where n is the index of the row lying in the range 0 to N−1, with the exception of the element corresponding to the reference column. The resulting block is a phase shifted extended block, written $C_{N\times(2K-1)}^E$.

For example, if $J_{N\times(2K-1)}$ is used to designate the phase permutation matrix that is defined as follows:

$$J_{N\times 2K-1} = \begin{bmatrix} j_{1\times 2K-1}^0 \\ \vdots \\ j_{1\times 2K-1}^{N-1} \end{bmatrix}$$

where $j_{1\times(2K-1)}^n$ is a vector in which all of the elements are equal to $(\sqrt{1})^n$, with the exception of the element having the same index as the reference column, which element is equal to 1.

Thus, if the reference column is the first column of the extended block (e.g. following a permutation of columns), $j_{1\times(2K-1)}^n$ is a vector such that the first element is equal to 1 and all of the other elements are equal to $(\sqrt{1})^n$. If the reference column is the central column of the extended block, then $j_{1\times(2K-1)}^n$ is a vector such that the central element is equal to 1 and all of the other elements are equal to $(\sqrt{1})^n$.

The phase shifted extended block can then be obtained using the following equations:

$$C_{N\times(2K-1)}^E = J_{N\times(2K-1)} \odot \overline{C}_{N\times(2K-1)}^E$$

where $\odot$ is the operator corresponding to the Hadamard product.

Returning to the above example proposed for K=4, the phase shifted extended block may be written in the following form:

| b1 | Re(b2) | b1* | a1 | a3* | Re(c2) | a3 |
|---|---|---|---|---|---|---|
| $\sqrt{-1}$a2 | $\sqrt{-1}$Im(b2) | $\sqrt{-1}$a2* | b3 | $\sqrt{-1}$d2 | $\sqrt{-1}$Re(c3) | $\sqrt{-1}$d2* |
| −c1* | −Im(c2) | −c1 | d1 | −d3 | −Im(c3) | −d3* |

During a third step at 13, the phase shifted extended block $C_{N\times(2K-1)}^E$ is filtered, delivering a filter block $X_{N\times(2K-1)}$ having N×(2K−1) filtered elements. By way of example, such filtering makes use of a filter of length 2K−1, such that the value of the filter coefficient of the same index as the reference column, referred to as the "reference" coefficient, is equal to 1, and the values of the other coefficients of the filter are symmetrical relative to the reference coefficient.

By way of example, the notation $H_{N\times(2K-1)}^f$ is used for the filter matrix defined by:

$$H_{N\times(2K-1)}^f = 1_{N\times 1} h_{1\times(2K-1)}^f$$

where $1_{N\times 1}$ is a column vector made up of elements equal to 1, and $h_{1\times(2K-1)}^f$ is a filter vector made up of the coefficients of the filter, having real values.

Thus, if the reference column is the first column of the extended block (e.g. following a permutation of columns), $h_{1\times(2K-1)}^f$ is a vector such that $h_{1\times(2K-1)}^f = [h_0^f, h_1^f, \ldots, h_{2K-2}^f, h_{2K-1}^f]$ in which the first element $h_0^f$ is equal to 1 and all of the other elements are less than 1 ($h_0^f > h_1^f > \ldots > h_{2K-2}^f > h_{2K-1}^f$). Thus, if the reference column is the second column of the extended block (e.g. following a permutation of columns), $h_{1\times(2K-1)}^f$ is a vector such that $h_{1\times(2K-1)}^f = [h_1^f, h_0^f, h_1^f, \ldots, h_{2K-2}^f]$ in which the second element $h_0^f$ is equal to 1 and all of the other elements are less than 1 and symmetrical relative to the second element $h_0^f$. If the reference column is the central column of the extended block, $h_{1\times(2K-1)}^f$ is a vector such that $h_{1\times(2K-1)}^f = [h_{K-1}^f, h_{K-2}^f, \ldots, h_1^f, h_0^f, h_1^f, \ldots, h_{K-2}^f, h_{K-1}^f]$ in which the central element $h_0^f$ is equal to 1 and all of the other elements are symmetrical relative to the central element (and $h_0^f > h_1^f > \ldots > h_{K-2}^f > h_{K-1}^f$).

In particular, the coefficients $h_k^f$ of the filter may be calculated so as to comply with Nyquist's criterion, such that:

$$h_k^f = \begin{cases} (h_0^f)^2 = 1 \\ (h_k^f)^2 + (h_{K-k}^f)^2 = 1, \text{ for } k \in [1, K-1] \end{cases}$$

The filter block can then be obtained using the following equations:

$$X_{N\times(2K-1)} = H_{N\times(2K-1)}^f \odot C_{N\times(2K-1)}^E$$

Repeating the preceding example proposed for K=4, and considering the filter vector $h_{1\times 7}^f = [h_3^f, h_2^f, h_1^f, h_0^f, h_1^f, h_2^f, h_3^f]$, the filtered block may be written in the following form:

| b1 · $h_3^f$ | Re(b2) · $h_2^f$ | b1* · $h_1^f$ | a1 · $h_0^f$ | a3* · $h_1^f$ | Re(c2) · $h_2^f$ | a3 · $h_3^f$ |
|---|---|---|---|---|---|---|
| $\sqrt{-1}$a2 · $h_3^f$ | $\sqrt{-1}$Im(b2) · $h_2^f$ | $\sqrt{-1}$a2* · $h_1^f$ | b3 · $h_0^f$ | $\sqrt{-1}$d2 · $h_1^f$ | $\sqrt{-1}$Re(c3) · $h_2^f$ | $\sqrt{-1}$d2* · $h_3^f$ |
| −c1* · $h_3^f$ | −Im(c2) · $h_2^f$ | −c1 · $h_1^f$ | d1 · $h_0^f$ | −d3 · $h_1^f$ | −Im(c3) · $h_2^f$ | −d3* · $h_3^f$ |

During a fourth step 14, the N×(2K−1) filtered elements of the filtered block $X_{N\times(2K-1)}$ are mapped onto MK frequency samples.

By way of example, for each row of the filtered block, such mapping performs a cyclic shift of nK positions, modulo MK, where n is the index of the row in the range 0 to (N−1), and a column by column sum of the elements obtained after cyclic shifting.

Repeating the above example for N=3 and K=4, and assuming that M=4, the following block is obtained after cyclic shifting by nK positions, modulo MK:

| Col0 | Col1 | Col2 | Col3 | Col4 | Col5 | Col6 | Col7 |
|---|---|---|---|---|---|---|---|
| $b1 \cdot h_3^f$ | $Re(b2) \cdot h_2^f$ | $b1^* \cdot h_1^f$ | $a1 \cdot h_0^f$ | $a3^* \cdot h_1^f$ $\sqrt{-1}a2 \cdot h_3^f$ | $Re(c2) \cdot h_2^f$ $\sqrt{-1}Im(b2) \cdot h_2^f$ | $a3 \cdot h_3^f$ $\sqrt{-1}a2^* \cdot h_1^f$ | $b3 \cdot h_0^f$ |

| Col8 | Col9 | Col10 | Col11 | Col12 | Col13 | Col14 | Col15 |
|---|---|---|---|---|---|---|---|
| $\sqrt{-1}d2 \cdot h_1^f$ $-c1^* \cdot h_3^f$ | $\sqrt{-1}Re(c3) \cdot h_2^f$ $-Im(c2) \cdot h_2^f$ | $\sqrt{-1}d2^* \cdot h_3^f$ $-c1 \cdot h_1^f$ | $d1 \cdot h_0^f$ | $-d3 \cdot h_1^f$ | $-Im(c3) \cdot h_2^f$ | $-d3^* \cdot h_3^f$ | |

Thereafter the following row vector is obtained after summing column by column:

| Col0 | Col1 | Col2 | Col3 | Col4 | Col5 | Col6 | Col7 |
|---|---|---|---|---|---|---|---|
| $b1 \cdot h_3^f$ | $Re(b2) \cdot h_2^f$ | $b1^* \cdot h_1^f$ | $a1 \cdot h_0^f$ | $a3^* \cdot h_1^f +$ $\sqrt{-1}a2 \cdot h_3^f$ | $Re(c2) \cdot h_2^f +$ $\sqrt{-1}Im(b2) \cdot h_2^f$ | $a3 \cdot h_3^f +$ $\sqrt{-1}a2^* \cdot h_1^f$ | $b3 \cdot h_0^f$ |

| Col8 | Col9 | Col10 | Col11 | Col12 | Col13 | Col14 | Col15 |
|---|---|---|---|---|---|---|---|
| $\sqrt{-1}d2 \cdot h_1^f -$ $c1^* \cdot h_3^f$ | $\sqrt{-1}Re(c3) \cdot h_2^f -$ $Im(c2) \cdot h_2^f$ | $\sqrt{-1}d2^* \cdot h_3^f -$ $c1 \cdot h_1^f$ | $d1 \cdot h_0^f$ | $-d3 \cdot h_1^f$ | $-Im(c3) \cdot h_2^f$ | $-d3^* \cdot h_3^f$ | |

More generally, for each row of the filtered block, the mapping performs both a cyclic shift modulo MK, enabling the element belonging to the reference column to be brought into the $([(n+m) K \bmod MK]+1)^{th}$ position, where m is the index of the first carrier allocated to a given user, for m lying in the range 0 to M−N−1, and n is the index of the row lying in the range 0 to (N−1), and also sums the elements obtained column by column after cyclic shifting.

Repeating the above example with N=3 and M=K=4, and assuming m=0, the cyclic shifting modulo MK making it possible to bring the element belonging to the reference column to the $([(n+m)K]+1)^{th}$ position delivers the following block:

This vector of MK frequency samples can be presented in the form of a column vector, in which each element corresponds to an entry of a module for transforming from the frequency domain to the time domain.

Returning to the generic expression for the filtered block, $X_{N \times (2K-1)}$, the mapping step seeks to map each row $x_{1 \times (2K-1)}^n$ of the filtered block to the MK entries of a module for transforming from the frequency domain to the time domain. At the output from the mapping step, a column vector is obtained of size MK, written $y_{MK \times 1}$, and that can be defined by the following equations:

$$y_{MK \times 1} = \sum_{n=0}^{N-1} y_{MK \times 1}^n$$

$$y_{MK \times 1}^n = (x_{1 \times 2K-1}^n G_{2K-1 \times MK}^n)^T$$

| Col0 | Col1 | Col2 | Col3 | Col4 | Col5 | Col6 | Col7 |
|---|---|---|---|---|---|---|---|
| $a1 \cdot h_0^f$ | $a3^* \cdot h_1^f$ $\sqrt{-1}a2 \cdot h_3^f$ | $Re(c2) \cdot h_2^f$ $\sqrt{-1}Im(b2) \cdot h_2^f$ | $a3 \cdot h_3^f$ $\sqrt{-1}a2^* \cdot h_1^f$ | $b3 \cdot h_0^f$ | $\sqrt{-1}d2 \cdot h_1^f$ $-c1^* \cdot h_3^f$ | $\sqrt{-1}Re(c3) \cdot h_2^f$ $-Im(c2) \cdot h_2^f$ | $\sqrt{-1}d2^* \cdot h_3^f$ $-c1 \cdot h_1^f$ |

| Col8 | Col9 | Col10 | Col11 | Col12 | Col13 | Col14 | Col15 |
|---|---|---|---|---|---|---|---|
| $d1 \cdot h_0^f$ | $-d3 \cdot h_1^f$ | $-Im(c3) \cdot h_2^f$ | $-d3^* \cdot h_3^f$ | | $b1 \cdot h_3^f$ | $Re(b2) \cdot h_2^f$ | $b1^* \cdot h_1^f$ |

Thereafter the following row vector is obtained after summing column by column:

| Col0 | Col1 | Col2 | Col3 | Col4 | Col5 | Col6 |
|---|---|---|---|---|---|---|
| $a1 \cdot h_0^f$ | $a3^* \cdot h_1^f +$ $\sqrt{-1}a2 \cdot h_3^f$ | $Re(c2) \cdot h_2^f +$ $\sqrt{-1}Im(b2) \cdot h_2^f$ | $a3 \cdot h_3^f +$ $\sqrt{-1}a2^* \cdot h_1^f$ | $b3 \cdot h_0^f$ | $\sqrt{-1}d2 \cdot h_1^f -$ $c1^* \cdot h_3^f$ | $\sqrt{-1}Re(c3) \cdot h_2^f -$ $Im(c2) \cdot h_2^f$ |

| Col7 | Col8 | Col9 | Col10 | Col11 | Col12 | Col13 | Col14 | Col15 |
|---|---|---|---|---|---|---|---|---|
| $\sqrt{-1}d2^* \cdot h_3^f -$ $c1 \cdot h_1^f$ | $d1 \cdot h_0^f$ | $-d3 \cdot h_1^f$ | $-Im(c3) \cdot h_2^f$ | $-d3^* \cdot h_3^f$ | | $b1 \cdot h_3^f$ | $Re(b2) \cdot h_2^f$ | $b1^* \cdot h_1^f$ |

-continued $$G^n_{2K-1 \times MK} = \begin{bmatrix} 0_{(m+n)K-K+1 \times 2K-1} \\ I_{2K-1} \\ 0_{(M-m-n-1)K \times 2K-1} \end{bmatrix}^T, \text{ for } n \neq 0$$

$$G^0_{2K-1 \times MK} = \begin{bmatrix} (0_{K \times K-1} \ I_K) \\ 0_{MK-2K+1 \times 2K-1} \\ (I_{K-1} \ 0_{K-1,K}) \end{bmatrix}^T, \text{ for } m = n = 0$$

where $I_{2K-1}$ is the unity matrix of size $(2K-1) \times (2K-1)$ and $(\cdot)^T$ is the transpose operator.

During an optional fifth step 15, it is possible to interleave the nonzero frequency samples that were not obtained from pilots. In the example described, consideration is given only to complex symbols of the data symbol type. It is thus possible to change the order of the $N \times K + K - 1 = 15$ nonzero frequency samples. Example, at the end of the optional interleaving step 15, the following vector $(\tilde{y}_{MK \times 1})^T$ is obtained:

to the last element of each column of the extended block following the reference column.

In this way, zero value symbols are placed on the last or the first carrier of a chunk.

For example, for a base block $C_{N \times K}$, with N being the number of carriers allocated to a user (e.g. a value that is a multiple of 12), and using the above defined equations for the extended block $\overline{C}_{N \times (K-1)}^E$, it is necessary to define zero value symbols on the last (or the first) carrier such that:

$$\text{For } K \text{ even: } \begin{cases} C_{N-1,K/2-1} = \mathfrak{R}\{C_{N-1,K/2-1}\} \\ C_{N-1,K/2+1 \ldots K-1} = 0 \end{cases}$$

For $K$ odd: $C_{N,(K-1)/2+1 \ldots K-1} = 0$

In particular, if the columns of the base block are permutated randomly before the extension step, then the above equations need to be adapted to take this permutation into account.

| Col0 | Col1 | Col2 | Col3 | Col4 | Col5 | Col6 |
|---|---|---|---|---|---|---|
| $a1 \cdot h_0^f$ | $-d3^* \cdot h_3^f$ | $Re(c2) \cdot h_2^f + \sqrt{-1}Im(b2) \cdot h_2^f$ | $a3 \cdot h_3^f + \sqrt{-1}a2^* \cdot h_1^f$ | $b3 \cdot h_0^f$ | $b1^* \cdot h_1^f$ | $\sqrt{-1}Re(c3) \cdot h_2^f - Im(c2) \cdot h_2^f$ |

| Col7 | Col8 | Col9 | Col10 | Col11 | Col12 | Col13 | Col14 | Col15 |
|---|---|---|---|---|---|---|---|---|
| $\sqrt{-1}d2^* \cdot h_3^f - c1 \cdot h_1^f$ | $a3^* \cdot h_1^f + \sqrt{-1}a2 \cdot h_3^f$ | $-d3 \cdot h_1^f$ | $-Im(c3) \cdot h_2^f$ | $d1 \cdot h_0^f$ | | $b1 \cdot h_3^f$ | $Re(b2) \cdot h_2^f$ | $\sqrt{-1}d2 \cdot h_1^f c1^* \cdot h_3^f$ |

Finally, during a sixth step 16, the MK frequency samples, possibly after interleaving, are transformed from the frequency domain to the time domain, using a conventional transform, e.g. an inverse Fourier transform. This produces a column vector of size MK, written $s_{MK \times 1}$, comprising the time samples of the multiple carrier signal.

For example, such a signal is obtained from the following equation:

$$s_{MK \times 1} = F_{MK \times MK}^H \cdot \tilde{y}_{MK \times 1}$$

(or $s_{MK \times 1} = F_{MK \times MK}^H \cdot y_{MK \times 1}$ if interleaving is not used) where $F_{MK \times MK}^H$ is a matrix representative of an inverse Fourier transform, with $(\cdot)^H$ being the conjugate transpose operator.

As mentioned above, the number of available carriers (M) may be greater than or equal to the number of carriers allocated to a user (N).

Thus, in the LTE system for example, only 300 carriers are used for transmitting payload data, out of the 512 carriers that are available. These 300 carriers are also grouped together into 25 groups of 12 carriers each, also known as "chunks". Different chunks may be allocated to different users.

In the proposed modulation technique, if two adjacent chunks are allocated to different users when M>N, then the data in them may overlap, running the risk of causing interference.

In order to solve this problem, it is possible to give a zero value to the first element of each column of the extended block preceding the reference column, or indeed a zero value In this way, the user is isolated from another user accessing the adjacent subband.

In particular, the energy saved by transmitting zero value symbols can be used advantageously to stimulate the remaining nonzero symbols, e.g. by increasing the order of a constellation or the coding rate.

Figure 2:
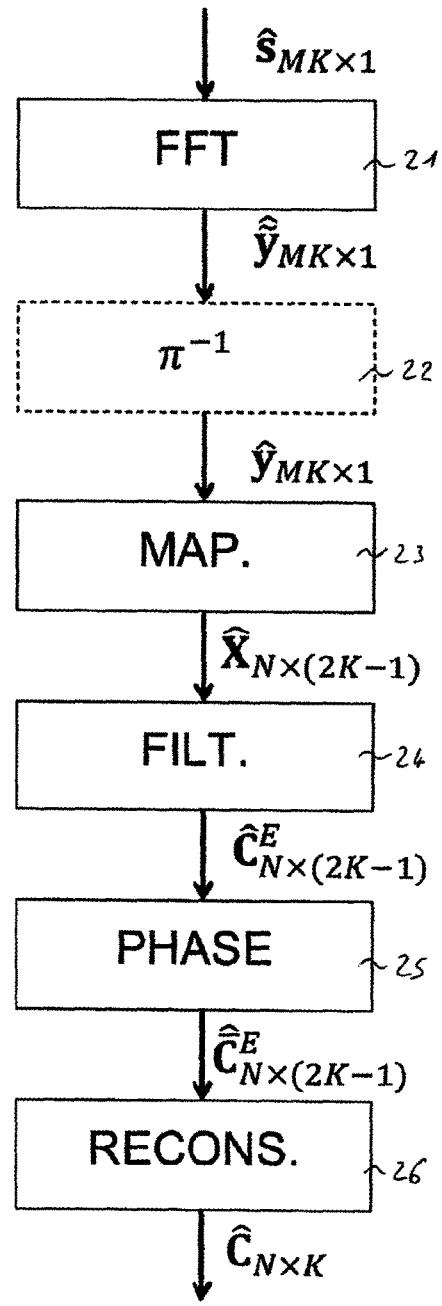
FIG. 2 shows the main steps performed by the demodulation technique in a particular implementation of the invention.

With reference to FIG. 2, there follows a description of the main steps performed by a method of demodulating a multiple carrier signal in an implementation of the invention, enabling at least one block of complex symbols to be reconstructed. In particular, such a multiple carrier signal is generated using the method as described above. Demodulation thus performs operations that are duals of the operations performed for generating the multiple carrier signal.

During a first step 21, MK time samples s[k] are received, where k lies in the range 0 to MK−1, and M and K are integers such that M>1 and K≥1. The vector $\hat{s}_{MK \times 1}$ made up of the MK time samples is transformed from the time domain into the frequency domain, e.g. by using a conventional transformation such as a Fourier transform.

This produces a column vector of size MK, e.g. written $\tilde{y}_{MK \times 1}$ if interleaving was performed at the modulation end, comprising MK interleaved frequency samples.

Returning to the example described above with reference to modulation, this gives by way of example $(\tilde{y}_{MK \times 1})^T$ defined as follows:

| Col0 | Col1 | Col2 | Col3 | Col4 | Col5 | Col6 |
|---|---|---|---|---|---|---|
| $a1 \cdot h_0^f$ | $-d3^* \cdot h_3^f$ | $Re(c2) \cdot h_2^f + \sqrt{-1}Im(b2) \cdot h_2^f$ | $a3 \cdot h_3^f + \sqrt{-1}a2^* \cdot h_1^f$ | $b3 \cdot h_0^f$ | $b1^* \cdot h_1^f$ | $\sqrt{-1}Re(c3) \cdot h_2^f - Im(c2) \cdot h_2^f$ |

| Col7 | Col8 | Col9 | Col10 | Col11 | Col12 | Col13 | Col14 | Col15 |
|---|---|---|---|---|---|---|---|---|
| $\sqrt{-1}d2^* \cdot h_3^f -$ $c1 \cdot h_1^f$ | $a3^* \cdot h_1^f +$ $\sqrt{-1}a2 \cdot h_3^f$ | $-d3 \cdot h_1^f$ | $-\text{Im}(c3) \cdot h_2^f$ | $d1 \cdot h_0^f$ | | $b1 \cdot h_3^f$ | $\text{Re}(b2) \cdot h_2^f$ | $\sqrt{-1}d2 \cdot h_1^f -$ $c1^* \cdot h_3^f$ |

In general manner, such a signal is obtained from the following equation:

$$\tilde{\hat{y}}_{MK\times 1} = F_{MK\times MK} \cdot \hat{s}_{MK\times 1}$$

(or $\hat{y}_{MK\times 1} = F_{MK\times MK} \cdot \hat{s}_{MK\times 1}$ if interleaving was not performed at the modulation end) where $F_{MK\times MK}$ is a matrix representative of a Fourier transform.

If interleaving is performed at the modulation end, deinterleaving is performed at the demodulation end during a second step 22, so as to recover the frequency samples in order. The vector $(\hat{y}_{MK\times 1})^T$ obtained after deinterleaving may be written in the following form:

| Col0 | Col1 | Col2 | Col3 | Col4 | Col5 | Col6 |
|---|---|---|---|---|---|---|
| $a1 \cdot h_0^f$ | $a3^* \cdot h_1^f +$ $\sqrt{-1}a2 \cdot h_3^f$ | $\text{Re}(c2) \cdot h_2^f +$ $\sqrt{-1}\text{Im}(b2) \cdot h_2^f$ | $a3 \cdot h_3^f +$ $\sqrt{-1}a2^* \cdot h_1^f$ | $b3 \cdot h_0^f$ | $\sqrt{-1}d2 \cdot h_1^f -$ $c1^* \cdot h_3^f$ | $\sqrt{-1}\text{Re}(c3) \cdot h_2^f -$ $\text{Im}(c2) \cdot h_2^f$ |

| Col7 | Col8 | Col9 | Col10 | Col11 | Col12 | Col13 | Col14 | Col15 |
|---|---|---|---|---|---|---|---|---|
| $\sqrt{-1}d2^* \cdot h_3^f -$ $c1 \cdot h_1^f$ | $d1 \cdot h_0^f$ | $-d3 \cdot h_1^f$ | $-\text{Im}(c3) \cdot h_2^f$ | $-d3^* \cdot h_3^f$ | | $b1 \cdot h_3^f$ | $\text{Re}(b2) \cdot h_2^f$ | $b1^* \cdot h_1^f$ |

During a third step 23, the MK frequency samples are mapped onto a block of N×(2K−1) elements, with N being an integer such that M≥N>1, which block is referred to as the demapped block and is written $\hat{X}_{N\times(2K-1)}$.

By way of example, in order to construct each $(n+1)^{th}$ row of the demapped block, the mapping step extracts (2K−1) frequency samples from among of the MK frequency samples, from the $([(m+n)K-(K-1)] \mod MK)+1)^{th}$ frequency sample.

Returning to the above-described example, the first row of the demapped block is constructed from the following seven frequency samples:

| | | | | | | |
|---|---|---|---|---|---|---|
| $b1 \cdot h_3^f$ | $\text{Re}(b2) \cdot h_2^f$ | $b1^* \cdot h_1^f$ | $a1 \cdot h_0^f$ | $a3^* \cdot h_1^f + \sqrt{-1}a2 \cdot h_3^f$ | $\text{Re}(c2) \cdot h_2^f +$ $\sqrt{-1}\text{Im}(b2) \cdot h_2^f$ | $a3 \cdot h_3^f + \sqrt{-1}a2^* \cdot h_1^f$ | the second row of the demapped block is constructed from the following seven frequency samples:

| | | | | | | |
|---|---|---|---|---|---|---|
| $a3^* \cdot h_1^f +$ $\sqrt{-1}a2 \cdot h_3^f$ | $\text{Re}(c2) \cdot h_2^f +$ $\sqrt{-1}\text{Im}(b2) \cdot h_2^f$ | $a3 \cdot h_3^f +$ $\sqrt{-1}a2^* \cdot h_1^f$ | $b3 \cdot h_0^f$ | $\sqrt{-1}d2 \cdot h_1^f -$ $c1^* \cdot h_3^f$ | $\sqrt{-1}\text{Re}(c3) \cdot h_2^f -$ $\text{Im}(c2) \cdot h_2^f$ | $\sqrt{-1}d2^* \cdot h_3^f -$ $c1 \cdot h_1^f$ | the third row of the demapped block is constructed from the following seven frequency samples:

| | | | | | | |
|---|---|---|---|---|---|---|
| $\sqrt{-1}d2 \cdot h_1^f -$ $c1^* \cdot h_3^f$ | $\sqrt{-1}\text{Re}(c3) \cdot h_2^f -$ $\text{Im}(c2) \cdot h_2^f$ | $\sqrt{-1}d2^* \cdot h_3^f -$ $c1 \cdot h_1^f$ | $d1 \cdot h_0^f$ | $-d3 \cdot h_1^f$ | $-\text{Im}(c3) \cdot h_2^f$ | $-d3^* \cdot h_3^f$ |

By using a matrix representation, each row $\hat{x}_{1\times(2K-1)}^n$ of the demapped block $\hat{X}_{N\times(2K-1)}$ can be obtained from the following equations:

$$\hat{x}_{1\times 2K-1}^n = \tilde{y}_{MK\times 1}^T (G_{2K-1\times MK}^n)^T$$

with the matrix G being as defined for the modulation end and with $$\hat{X}_{N\times(2K-1)} = \begin{bmatrix} \hat{x}_{1\times(2K-1)}^0 \\ M \\ \hat{x}_{1\times(2K-1)}^{N-1} \end{bmatrix}.$$

During a fourth step 24, the demapped block $\hat{X}_{N\times(2K-1)}$ as obtained in this way is filtered, delivering a filtered block $\hat{C}_{N\times(2K-1)}^E$ of N×(2K−1) filtered elements. By way of example, such filtering makes use of a filter of length 2K−1, such that the value of the filter coefficient of the same index as the reference column, referred to as the "reference" coefficient, is equal to 1, and the values of the other coefficients of the filter are symmetrical relative to the reference coefficient. Such a filter is similar to the filter used at the modulation end.

Thus, returning to the above example, consideration is given to the demapped block defined by the three rows described above, which is multiplied by the filter matrix $h_{1\times 7}^f = [h_3^f, h_2^f, h_1^f, h_0^f, h_1^f, h_2^f, h_3^f]$, in order to obtain the following filtered block:

| | | | | | | | |
|---|---|---|---|---|---|---|---|
| b1 · $(h_3^f)^2$ | Re(b2) · $(h_2^f)^2$ | b1* · $(h_1^f)^2$ | a1 · 1 | a3* · $(h_1^f)^2$ + $\sqrt{-1}$a2 · $h_3^f h_1^f$ | Re(c2) · $(h_2^f)^2$ + $\sqrt{-1}$Im(b2) · $(h_2^f)^2$ | a3 · $(h_3^f)^2$ + $\sqrt{-1}$a2* · $h_1^f h_3^f$ | |
| a3* · $h_1^f h_3^f$ + $\sqrt{-1}$a2 · $(h_3^f)^2$ $\sqrt{-1}$d2 · $h_1^f h_3^f$ − c1* · $(h_3^f)^2$ | Re(c2) · $(h_2^f)^2$ + $\sqrt{-1}$Im(b2) · $(h_2^f)^2$ $\sqrt{-1}$Re(c3) · $(h_2^f)^2$ − Im(c2) · $(h_2^f)^2$ | a3 · $h_3^f h_1^f$ + $\sqrt{-1}$a2* · $(h_1^f)^2$ $\sqrt{-1}$d2* · $h_3^f h_1^f$ − c1 · $(h_1^f)^2$ | b3 · 1 d1 · 1 | $\sqrt{-1}$d2 · $(h_1^f)^2$ − c1* · $h_3^f h_1^f$ −d3 · $(h_1^f)^2$ | $\sqrt{-1}$Re(c3) · $(h_2^f)^2$ − Im(c2) · $(h_2^f)^2$ −Im(c3) · $(h_2^f)^2$ | $\sqrt{-1}$d2* · $(h_3^f)^2$ − c1 · $h_1^f h_3^f$ −d3* · $(h_3^f)^2$ | |

In more general manner, the extended block $\hat{C}_{N\times(2K-1)}^{E}$ can be obtained from the following equations:

$$\hat{C}_{N\times(2K-1)}^{E} = H_{N\times(2K-1)}^{f} \odot \hat{X}_{N\times(2K-1)}$$

During a fifth step 25, the filtered block is phase shifted. The resulting phase shifted filtered block is written $\overline{C}_{N\times(2K+1)}^{E}$. By way of example, such phase shifting makes use of row by row phase shifting of the filtered block, multiplying elements of an $(n+1)^{th}$ row of the filtered block by a value equal to $(\sqrt{-1})^n$, with n lying in the range 0 to N−1, with the exception of the element corresponding to the reference column, which is multiplied by 1. The phase shifting performed at the demodulation end is similar to the phase shifting performed at the modulation end.

Thus, returning to the above example, the phase shifted filtered block obtained after the phase shifting operation is:

| | | | | | | | |
|---|---|---|---|---|---|---|---|
| b1 · $(h_3^f)^2$ | Re(b2) · $(h_2^f)^2$ | b1* · $(h_1^f)^2$ | a1 | a3* · $(h_1^f)^2$ + $\sqrt{-1}$a2 · $h_3^f h_1^f$ | Re(c2) · $(h_2^f)^2$ + $\sqrt{-1}$Im(b2) · $(h_2^f)^2$ | a3 · $(h_3^f)^2$ + $\sqrt{-1}$a2* · $h_1^f h_3^f$ | |
| −ja3* · $h_1^f h_3^f$ + a2 · $(h_3^f)^2$ $-\sqrt{-1}$d2 · $h_1^f h_3^f$ + c1* · $(h_3^f)^2$ | −jRe(c2) · $(h_2^f)^2$ + Im(b2) · $(h_2^f)^2$ $-\sqrt{-1}$Re(c3) · $(h_2^f)^2$ + Im(c2) · $(h_2^f)^2$ | −ja3 · $h_3^f h_1^f$ + a2* · $(h_1^f)^2$ $-\sqrt{-1}$d2* · $h_3^f h_1^f$ + c1 · $(h_1^f)^2$ | b3 d1 | d2 · $(h_1^f)^2$ + jc1* · $h_3^f h_1^f$ d3 · $(h_1^f)^2$ | Re(c3) · $(h_2^f)^2$ + jIm(c2) · $(h_2^f)^2$ Im(c3) · $(h_2^f)^2$ | d2* · $(h_3^f)^2$ + jc1 · $h_1^f h_3^f$ d3* · $(h_3^f)^2$ | |

In more general manner, the phase shifted filtered block $\overline{C}_{N\times(2K+1)}^{E}$ can be obtained from the following equations:

$$\overline{C}_{N\times(2K+1)}^{E} = J^*_{N\times(2K-1)} \odot \hat{C}_{N\times(2K-1)}^{E}$$

where $J_{N\times(2K-1)}$ is the phase permutation matrix defined at the modulation end.

During a sixth step 26, a block $\hat{C}_{N\times K}$ of N×K complex symbols is reconstructed row by row from the phase shifted block N×K.

Two situations are distinguished, depending on the value of K.

Thus, if K is odd, a reference column is identified having N first elements in the phase shifted filtered block, giving N first reconstructed complex symbols. For the N×(2K−1)−N remaining elements of the phase shifted filtered block, elements of a row of the phase shifted filtered block are summed in pairs with the conjugates of respective other elements of the same row, in such a manner as to obtain $$\frac{N\times(2K-1)-N}{2}$$

reconstructed complex symbols.

If K is even, a reference column is identified having N first elements in the phase shifted filtered block, giving N first reconstructed complex symbols. For 2N second elements of the phase shifted filtered block, distinct from the N first elements, the real portions of the 2N second elements are summed in pairs so as to obtain N second reconstructed complex symbols. Finally, for the N×(2K−1)−3N remaining elements of the phase shifted filtered block, elements of a row of the phase shifted filtered block are summed in pairs with the conjugates of respective other elements of the same row, in such a manner as to obtain $$\frac{N\times(2K-1)-3N}{2}$$

reconstructed complex symbols.

It should be observed that the manner of reconstructing the base block is not limited to the particular implementation described above. For example, if K is even, it is possible to choose to identify a reference column to obtain the N first reconstructed complex symbols, and then to reconstruct $$\frac{N\times(2K-1)-3N}{2}$$

by summing in pairs elements and conjugate elements of the same line, followed by reconstructing N second complex symbols by summing in pairs the real portions of the 2N second elements.

Returning to the above example, the fourth column is identified in the phase shifted filtered block as being a reference column. This serves to obtain directly the first three reconstructed complex symbols: a1, b3 and d1.

Thereafter, 2N second elements are identified in the phase shifted filtered block, e.g. the following elements:

$Re(b2) \cdot (h_2^f)^2, -jRe(c2)(h_2^f)^2 + Im(b2) \cdot (h_2^f)^2, Re(c_2) \cdot (h_2^f)^2 + \sqrt{-1}Im(b2) \cdot (h_2^f)^2, -\sqrt{-1}Re(c3) \cdot (h_2^f)^2 + Im(c2) \cdot (h_2^f)^2, Re(c3) \cdot (h_2^f)^2 + jIm(c2) \cdot (h_2^f)^2, Im(c3) \cdot (h_2^f)^2,$ and the real portions of these elements are summed in pairs. This serves to obtain three new reconstructed symbols:

$\sqrt{2}(Re(Re(b2) \cdot (h_2^f)^2) + jRe(-jRe(c2)(h_2^f)^2 + Im(b2) \cdot (h_2^f)^2))$ $\sqrt{2}(Re(Re(c2) \cdot (h_2^f)^2 + \sqrt{-1}Im(b2) \cdot (h_2^f)^2) + jRe(-\sqrt{-1}Re(c3) \cdot (h_2^f)^2 + Im(c2) \cdot (h_2^f)^2))$ $\sqrt{2}(Re(Re(c3) \cdot (h_2^f)^2 + jIm(c2) \cdot (h_2^f)^2) + jRe(Im(c3) \cdot (h_2^f)^2))$ It should be observed that multiplying by the term in $\sqrt{2}$ serves to normalize the amplitude of the reconstructed complex symbols.

For the remaining elements of the phase shifted filtered block, elements of a row of the phase shifted filtered block are summed in pairs with the conjugates of respective other elements of the same row, in such a manner as to obtain the following six reconstructed complex symbols:

$(-ja3* \cdot h_1^f h_3^f + a2 \cdot (h_3^f)^2) + (-ja3 \cdot h_1^f h_3^f + a2* \cdot (h_1^f)^2)*$ $(a3^* \cdot (h_1^f)^2 + \sqrt{-1} a2 \cdot h_1^f h_3^f)^* + (a3 \cdot (h_3^f)^2 + \sqrt{-1} a2^* \cdot h_1^f h_3^f)$ $(b1 \cdot (h_3^f)^2) + (b1^* \cdot (h_1^f)^2)^*$ $(-\sqrt{-1} d2 \cdot h_1^f h_3^f + c1^* \cdot (h_3^f)^2)^* + (-\sqrt{-1} d2^* \cdot h_1^f h_3^f + c1 \cdot (h_1^f)^2)$ $(d2 \cdot (h_1^f)^2 + jc1^* \cdot h_1^f h_3^f) + (d2^* \cdot (h_3^f)^2 + jc1 \cdot h_1^f h_3^f)^*$ $(d3 \cdot (h_1^f)^2) + (d3^* \cdot (h_3^f)^2)^*$ The 12 complex symbols as reconstructed in this way can be placed in the reconstructed block $\hat{C}_{N \times K}$, by taking account of the way in which the extended block is constructed from the base block at the modulation end.

In more general manner, the extended block $\hat{C}_{N \times K}$ can be obtained from the following equations:

if K is even:

$$\hat{C}_{n,k} = \begin{cases} \hat{C}_{n,k} = \tilde{C}_{n,k} + \tilde{C}^*_{n,K-k}, k \in [0, (K-1)/2 - 1] \\ \hat{C}_{n,(K-1)/2} = \tilde{C}_{n,K-1} \\ \hat{C}_{n,k+(K-1)/2+1} = \tilde{C}_{n,k+K} + (\tilde{C}_{n,2K-1-k})^*, k \in [0, (K-1)/2 - 1] \end{cases}$$

if K is odd:

$$\hat{C}_{n,k} = \begin{cases} \hat{C}_{n,k} = \tilde{C}_{n,k} + \tilde{C}^*_{n,K-k}, k \in [0, (K/2) - 2] \\ \hat{C}_{n,(K/2)-1} = \sqrt{2} (\Re\{\tilde{C}_{n,(K/2)-1}\} + j\Im\{\tilde{C}_{m(K/2)-1+K}\}) \\ \hat{C}_{n,K/2} = \tilde{C}_{n,K-1} \\ \hat{C}_{n,k+K/2+1} = \tilde{C}_{n,k+K} + (\tilde{C}_{n,2K-1-k})^* k \in [0, (K/2) - 2] \end{cases}$$

Figure 3:
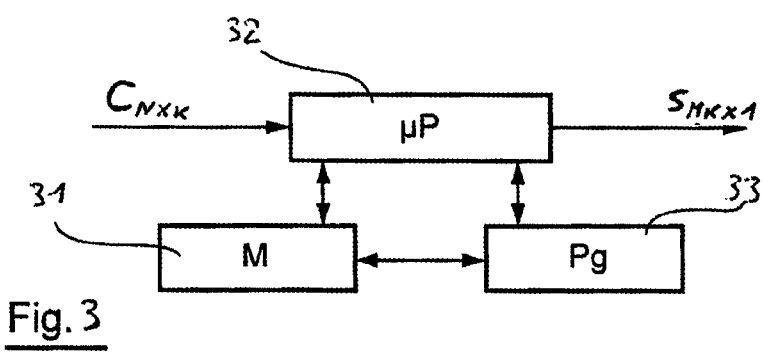
FIGS. 3 and 4 show respectively the simplified structure of a modulator performing a modulation technique, and of a demodulator performing a demodulation technique in particular embodiments of the invention.
Figure 4:
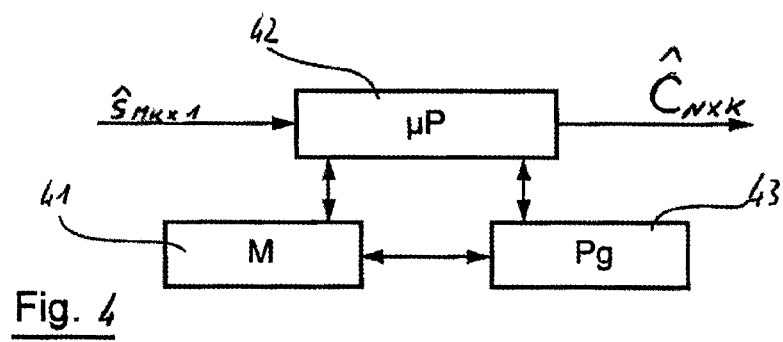

Furthermore, with reference to FIGS. 3 and 4 respectively, there follows a description of the simplified structure of a modulation device serving in particular to perform FB-OFDM type modulation and the structure of a demodulation device serving in particular to perform FB-OFDM type demodulation in a particular embodiment of the invention.

As shown in FIG. 3, a modulator in a particular embodiment of the invention comprises a memory 31 including a buffer memory, a processor unit 32, e.g. having a microprocessor µP and controlled by the computer program 33 performing the modulation method in an implementation of the invention.

On initialization, the code instructions of the computer program 33 are loaded by way of example into a random access memory (RAM) prior to being executed by the processor of the processor unit 32. The processor unit 32 receives as input at least one base block of complex symbols written $C_{N \times K}$. The microprocessor of the processor unit 32 performs the steps of the above-described modulation method in compliance with the computer program instructions 33 in order to generate a multiple carrier signal made up of MK time samples $s_{MK \times 1}$. To do this, in addition to the buffer memory 31, the modulator comprises:

- an extender module for extending the base block $C_{N \times K}$, delivering a block of N×(2K−1) elements, referred to as an "extended" block $\overline{C}_{N \times (2K+1)}^E$, and constructed as described above;
- a phase shifter module for phase shifting the extended block $\overline{C}_{N \times (2K+1)}^E$, delivering a phase shifted extended block $\overline{\overline{C}}_{N \times (2K+1)}^E$;
- a filter module for filtering the phase shifted extended block $\overline{\overline{C}}_{N \times (2K+1)}^E$, delivering a block of N×(2K−1) filtered elements, referred to as a "filtered" block $X_{N \times (2K+1)}$;
- a mapping module for mapping the N×(2K−1) filtered elements of the filtered block $X_{N \times (2K+1)}$ onto MK frequency samples, delivering a vector $y_{MK \times 1}$, with M being the total number of carriers and with M≥N;
- optionally an interleaving module for interleaving the frequency samples, delivering a vector $\tilde{y}_{MK \times 1}$ of MK interleaved frequency samples; and
- a transformation module for transforming the possibly interleaved MK frequency samples from the frequency domain to the time domain, delivering the MK time samples $s_{MK \times 1}$ forming the multiple carrier signal.

These modules are controlled by the microprocessor of the processor unit 32.

As shown in FIG. 4, a demodulator in a particular embodiment of the invention comprises a memory 41 including a buffer memory, a processor unit 42, e.g. having a microprocessor µP and controlled by the computer program 43 performing the demodulation method in an implementation of the invention.

On initialization, the code instructions of the computer program 43 are loaded by way of example into a RAM prior to being executed by the processor of the processor unit 42. The processor unit 42 receives as input MK time samples $\hat{s}_{MK \times 1}$ forming the multiple carrier signal, in order to reconstruct at least one block of complex symbols $\hat{C}_{N \times K}$. The microprocessor of the processor unit 42 performs the steps of the above-described demodulation method in application of the instructions of the computer program 43 in order to reconstruct at least one symbol block. To do this, in addition to the buffer memory 41, the demodulator comprises:

- a transformation module for transforming the MK time samples $\hat{s}_{MK \times 1}$ of the multiple carrier signal from the time domain to the frequency domain, delivering MK frequency samples $\hat{y}_{MK \times 1}$ (or possibly $\hat{\tilde{y}}_{MK \times 1}$ if interleaving is performed at the modulation end), with M and K being integers such that M>1 and K>1;
- optionally a deinterleaving module for deinterleaving the frequency samples, delivering a vector $\hat{y}_{MK \times 1}$ of MK deinterleaved frequency samples;
- a mapping module for mapping the possibly deinterleaved MK frequency samples $\hat{y}_{MK \times 1}$ onto a block of N×(2K−1) elements, where N is an integer such that M≥N>1, referred to as a "demapped" block $\hat{X}_{N \times (2K+1)}$;
- a filter module for filtering the demapped block $\hat{X}_{N \times (2K+1)}$, delivering a block of N×(2K−1) filtered elements, referred to as a "filtered" block $\hat{C}_{N \times (2K+1)}^E$;
- a dephase-shifting module for diphase-shifting the filtered block $\hat{C}_{N \times (2K+1)}^E$, delivering a dephase-shifted block $\overline{\hat{C}}_{N \times (2K+1)}^E$; and
- a reconstruction module for reconstructing a base block from the dephase-shifted filtered block $\overline{\hat{C}}_{N \times (2K+1)}^E$, delivering a block of N×K reconstructed complex symbols, referred to as a "reconstructed" block $\hat{C}_{N \times K}$, as described above.

These modules are controlled by the microprocessor of the processor unit 42.

The invention claimed is:

1. A modulation method comprising:
modulating complex symbols with a modulation device, delivering a multiple carrier signal; wherein the modulation device performs the following steps, for at least one block of N×K complex symbols, referred to as a base block, where N and K are integers such that N>1 and K>1:
  extending said base block to deliver a block of N×(2K−1) elements, referred to as an extended block, comprising:
    if K is odd:
      a column comprising N elements corresponding to N first complex symbols of said base block, referred to as a reference column; and
      2K−2 columns comprising N(2K−2) elements, of which N(K−1) elements correspond to remaining NK−N complex symbols of said base block and N(K−1) elements correspond to conjugates of said remaining NK−N complex symbols of said base block;
    if K is even:
      a column comprising N elements corresponding to the N first complex symbols of said base block, referred to as the reference column;
      two columns comprising 2N elements, of which N elements correspond to the real parts of said N second complex symbols of said base block, distinct from said N first complex symbols, and N elements correspond to the imaginary parts of said N second complex symbols; and
      2K−4 columns comprising N(2K−4) elements, of which N(K−2) elements correspond to remaining NK−2N complex symbols of said base block and N(K−2) elements correspond to the conjugates of said remaining NK−2N complex symbols of said base block;
  phase shifting said extended block, delivering a phase shifted extended block;
  filtering said phase shifted extended block, delivering a block of N×(2K−1) filtered elements, referred to as a filtered block;
  mapping the N×(2K−1) filtered elements of said filtered block on MK frequency samples, where M is a total number of carriers and M≥N; and
  transforming said MK frequency samples from a frequency domain to a time domain, delivering said multiple carrier signal.

2. The modulation method according to claim 1, wherein said extending step performs the following sub-steps:
  randomly selecting said first N complex symbols of said base block, and allocating them to said reference column, corresponding to the central column of said extended block;
  if K is odd:
    determining the conjugates of remaining N(K−1) complex symbols of said base block;
    allocating a first half of said remaining N(K−1) complex symbols and their respective conjugates to (K−1) columns to the left of said reference column, with a symmetrical relationship between said remaining complex symbols and their respective conjugates; and
    allocating a second half of said remaining N(K−1) complex symbols and their respective conjugates to (K−1) columns to the right of said reference column, with a symmetrical relationship between said remaining complex symbols and their respective conjugates;
  if K is even:
    randomly selecting said N second complex symbols of said base block;
    determining the real parts and the imaginary parts of said N second complex symbols;
    allocating one of said real or imaginary parts of each of said N second complex symbols to a central column from among the columns to the left of said reference column of said extended block, referred to as the left central column;
    allocating the other one of said real or imaginary parts of each of said N second complex symbols to a central column from among the columns to the right of said reference column of said extended block, referred to as the right central column;
    determining the conjugates of remaining N(K−2) complex symbols of said base block;
    allocating a first half of said remaining N(K−2) complex symbols and their respective conjugates to columns to the left of said reference column, with a symmetrical relationship between said remaining complex symbols and their respective conjugates relative to said left central column; and
    allocating a second half of said remaining N(K−2) complex symbols and their respective conjugates to columns to the right of said reference column, with a symmetrical relationship between said remaining complex symbols and their respective conjugates relative to said right central column.

3. The modulation method according to claim 1, wherein said phase shifting step performs a phase shift row by row of said extended block, while multiplying elements of an $(n+1)^{th}$ row of said extended block, with the exception of the element corresponding to said reference column, by a value equal to $(\sqrt{-1})^n$, where n lies in the range 0 to N−1.

4. The modulation method according to claim 1, wherein said phase shifted extended block $C_{N \times (2K-1)}^E$ is obtained from the following equations:

$$C_{N \times (2K-1)}^E = J_{N \times (2K-1)} \square \overline{C}_{N \times (2K-1)}^E$$

with:

$$J_{N \times 2K-1} = \begin{bmatrix} j_{1 \times 2K-1}^0 \\ \vdots \\ j_{1 \times 2K-1}^{N-1} \end{bmatrix}$$

if K is even:

$$\overline{C}_{N \times 2K-1}^E = \begin{cases} \overline{C}_{n,k}^E = (\overline{C}_{n,K-k}^E)^* = C_{n,k}, k \in [0, (K/2)-2] \\ \overline{C}_{n,(K/2)-1}^E = \sqrt{2}\, \Re\{C_{n,(K/2)-1}\} \\ \overline{C}_{n,(K/2)-1+K}^E = \sqrt{2}\, \mathcal{I}\{C_{n,(K/2)-1}\} \\ \overline{C}_{n,K-1}^E = C_{n,K/2} \\ \overline{C}_{n,k+K}^E = (\overline{C}_{n,2K-1-k}^E)^* = C_{n,k+K/2+1}, k \in [0, (K/2)-2] \end{cases}$$

if K is odd:

$$\overline{C}_{N \times 2K-1}^E = \begin{cases} \overline{C}_{n,k}^E = (\overline{C}_{n,K-k}^E)^* = C_{n,k}, k \in [0, (K-1)/2-1] \\ \overline{C}_{n,K-1}^E = C_{n,(K-1)/2} \\ \overline{C}_{n,k+K}^E = (\overline{C}_{n,2K-1-k}^E)^* = C_{n,k+(K-1)/2+1} = C_{n,k+(K-1)/2+1}, \\ k \in [0, (K-1)/2-1] \end{cases}$$

n is an integer lying in the range 0 to N−1;
k is an integer lying in the range 0 to K−1;
* is the conjugate operator;
☐ is the Hadamard product; and
$j_{1\times(2K-1)}^n$ is a vector in which all of the elements are equal to $(\sqrt{-1})^n$, with the exception of the element having the same index as the reference column, which element is equal to 1.

5. The modulation method according to claim 1, wherein said filtering step makes use of a filter of length 2K−1, such that the value of the filter coefficient of the same index as the reference column, referred to as the reference coefficient, is equal to 1, and the values of the other coefficients of the filter are symmetrical relative to the reference coefficient.

6. The modulation method according to claim 1, wherein for each row of the filtered block, the mapping step performs both a cyclic shift modulo MK, enabling the element belonging to the reference column to be brought into the $([(n+m)K \mod MK]+1)^{th}$ position, where m is the index of the first carrier allocated to a given user, for m lying in the range 0 to M−N−1, and n is the index of the row lying in the range 0 to (N−1), and also sums the elements obtained after cyclic shifting column by column.

7. The modulation method according to a claim 1, wherein, when N<M, a zero value is given to the first element of each column of the extended block preceding said reference column, or indeed a zero value is given to the last element of each column of said extended block following the reference column.

8. The modulation method according to claim 1, wherein the modulation device also interleaves said frequency samples obtained at the output from said mapping step, prior to said step of transforming from the frequency domain to the time domain.

9. A modulation device comprising:
a processor;
a non-transitory computer-readable medium comprising instructions stored thereon, which when executed by the processor configure the modulation device to perform the following acts to modulate complex symbols, delivering a multiple carrier signal, for at least one block of N×K complex symbols, referred to as a base block, where N and K are integers such that N>1 and K>1:
extending said base block to deliver a block of N×(2K−1) elements, referred to as an extended block, comprising:
if K is odd:
a column comprising N elements corresponding to N first complex symbols of said base block, referred to as a reference column;
2K−2 columns comprising N(2K−2) elements, of which N(K−1) elements correspond to remaining NK−N complex symbols of said base block and N(K−1) elements correspond to conjugates of said remaining NK−N complex symbols of said base block;
if K is even:
a column comprising N elements corresponding to the N first complex symbols of said base block, referred to as the reference column;
two columns comprising 2N elements, of which N elements correspond to the real parts of said N second complex symbols of said base block, distinct from said N first complex symbols, and N elements correspond to the imaginary parts of said N second complex symbols;
2K−4 columns comprising N(2K−4) elements, of which N(K−2) elements correspond to remaining NK−2N complex symbols of said base block and N(K−2) elements correspond to conjugates of said remaining NK−2N complex symbols of said base block;
phase shifting said extended block, delivering a phase shifted extended block;
filtering said phase shifted extended block, delivering a block of N×(2K−1) filtered elements, referred to as a filtered block;
mapping the N×(2K−1) filtered elements of said filtered block on MK frequency samples, where M is a total number of carriers and M≥N; and
transforming said MK frequency samples from a frequency domain to a time domain, delivering said multiple carrier signal.

10. A demodulation method comprising:
demodulating a multiple carrier signal with a demodulation device, delivering at least one block of reconstructed complex symbols; wherein the demodulation device performs the following steps:
transforming a said multiple carrier signal from a time domain to a frequency domain, delivering MK frequency samples, where M and K are integers such that M>1 and K>1;
mapping said MK frequency samples on a block of N×(2K−1) elements, where N is an integer such that M≥1, referred to as a demapped block;
filtering said demapped block, delivering a block of N×(2K−1) filtered elements, referred to as a filtered block;
dephase-shifting a said filtered block, delivering a block referred to as a dephase-shifted filtered block; and
reconstructing a base block from said dephase-shifted filtered block, delivering a block of N×K reconstructed complex symbols, referred to as a reconstructed block, by:
if K is odd: identifying a reference column of the N first elements in said dephase-shifted filtered block, delivering N first reconstructed complex symbols, and for remaining N×(2K−1)−N elements of said dephase-shifted filtered block, summing elements of a row of said dephase-shifted filtered block in pairs with conjugates of respective other elements of said row, delivering $$\frac{N \times (2K-1) - N}{2}$$

reconstructed complex symbols;
if K is even: identifying a reference column of N first elements in said dephase-shifted filtered block, delivering N first reconstructed complex symbols, for 2N second elements of said dephase-shifted filtered block, summing real parts of said 2N second elements in pairs delivering N second reconstructed complex symbols, and for remaining N×(2K−1)−3N elements of said dephase-shifted filtered block, summing elements of a row of said dephase-shifted filtered block in pairs with conjugates of respective other elements of said row, delivering $$\frac{N \times (2K-1) - 3N}{2}$$

reconstructed complex symbols.

11. The demodulation method according to claim 10, wherein said reconstructed block $\hat{C}_{N \times K}$ is obtained from the following equations:

if K is odd:

$$\hat{C}_{n,k} = \begin{cases} \hat{C}_{n,k} = \tilde{C}_{n,k} + \tilde{C}^*_{n,K-k}, k \in [0, (K/2)-2] \\ \hat{C}_{n,(K/2)-1} = \sqrt{2} \left( \Re\{\tilde{C}_{n,(K/2)-1}\} + j\Re\{\tilde{C}_{m(K/2)-1+K}\} \right) \\ \hat{C}_{n,K/2} = \tilde{C}_{n,K-1} \\ \hat{C}_{n,k+K/2+1} = \tilde{C}_{n,k+K} + (\tilde{C}_{n,2K-1-k})^* k \in [0, (K/2)-2] \end{cases}$$

if K is even:

$$\hat{C}_{n,k} = \begin{cases} \hat{C}_{n,k} = \tilde{C}_{n,k} + \tilde{C}^*_{n,K-k}, k \in [0, (K-1)/2 - 1] \\ \hat{C}_{n,(K-1)/2} = \tilde{C}_{n,K-1} \\ \hat{C}_{n,k+(K-1)/2+1} = \tilde{C}_{n,k+K} + (\tilde{C}_{n,2K-1-k})^*, k \in [0, (K-1)/2 - 1] \end{cases}$$

with:

$$\cdot \tilde{C}_{N \times (2K-1)} = J^*_{N \times (2K-1)} \square \hat{C}^E_{N \times (2K-1)}$$

$$\cdot J_{N \times 2K-1} = \begin{bmatrix} j^0_{1 \times 2K-1} \\ \vdots \\ j^{N-1}_{1 \times 2K-1} \end{bmatrix}$$

$\hat{C}_{N \times (2K-1)}^E$ is said filtered block;
$\tilde{C}_{N \times (2K-1)} = [\tilde{C}_{n,l}]_{n=0,\ldots,N-1 \text{ and } l=0,\ldots,2K-1}$
$\hat{C}_{N \times K} = [\hat{C}_{n,k}]_{n=0,\ldots,N-1 \text{ and } k=0,\ldots,K-1}$
n is an integer lying in the range 0 to N−1;
k is an integer lying in the range 0 to K−1;
* is the conjugate operator;
□ is the Hadamard product; and
$j_{1 \times (2K-1)}^n$ is a vector in which all of the elements are equal to $(\sqrt{-1})^n$, with the exception of the element having the same index as the reference column, which element is equal to 1.

12. The demodulation method according to claim 10, wherein, in order to construct each $(n+1)^{th}$ row of said demapped block, said mapping step (23) extracts (2K−1) frequency samples from said MK frequency samples, from the $([(m+n) K−(K−1)] \mod MK)+1)^{th}$ frequency sample, where m is the index of the first carrier allocated to a given user.

13. A demodulation device comprising:
a processor;
a non-transitory computer-readable medium comprising instructions stored thereon, which when executed by the processor configure the demodulation device to perform the following acts to demodulate a multiple carrier signal, delivering at least one block of reconstructed complex symbols:
transforming said multiple carrier signal from a time domain to a frequency domain, delivering MK frequency samples, where M and K are integers such that M>1 and K>1;
mapping said MK frequency samples on a block of N×(2K−1) elements, where N is an integer such that M≥1, referred to as a demapped block;
filtering said demapped block, delivering a block of N×(2K−1) filtered elements, referred to as a filtered block;
dephase-shifting said filtered block, delivering a block referred to as a dephase-shifted filtered block; and
reconstructing a base block from said dephase-shifted filtered block, delivering a block of N×K reconstructed complex symbols, referred to as a reconstructed block, by:
if K is odd: identifying a reference column of the N first elements in said dephase-shifted filtered block, delivering N first reconstructed complex symbols, and for remaining N×(2K−1)−N elements of said dephase-shifted filtered block, summing elements of a row of said dephase-shifted filtered block in pairs with conjugates of respective other elements of said row, delivering $$\frac{N \times (2K-1) - N}{2}$$

reconstructed complex symbols;
if K is even: identifying a reference column of N first elements in said dephase-shifted filtered block, delivering N first reconstructed complex symbols, for 2N second elements of said dephase-shifted filtered block, summing real parts of said 2N second elements in pairs delivering N second reconstructed complex symbols, and for remaining N×(2K−1)−3N elements of said dephase-shifted filtered block, summing elements of a row of said dephase-shifted filtered block in pairs with conjugates of respective other elements of said row, delivering $$\frac{N \times (2K-1) - 3N}{2}$$

reconstructed complex symbols.

14. A non-transitory computer-readable medium comprising a computer program stored thereon including instructions for performing a modulation method when the program is executed by a processor of a modulation device, wherein the method comprises:
modulating complex symbols with the modulation device, delivering a multiple carrier signal; wherein the modulation device performs the following steps, for at least one block of N×K complex symbols, referred to as a base block, where N and K are integers such that N>1 and K>1:
extending said base block to deliver a block of N×(2K−1) elements, referred to as an extended block, comprising:
if K is odd:
a column comprising N elements corresponding to N first complex symbols of said base block, referred to as a reference column; and
2K−2 columns comprising N(2K−2) elements, of which N(K−1) elements correspond to remaining NK−N complex symbols of said base block and N(K−1) elements correspond to conjugates of said remaining NK−N complex symbols of said base block;

if K is even:
- a column comprising N elements corresponding to the N first complex symbols of said base block, referred to as the reference column;
- two columns comprising 2N elements, of which N elements correspond to the real parts of said N second complex symbols of said base block, distinct from said N first complex symbols, and N elements correspond to the imaginary parts of said N second complex symbols; and
- 2K−4 columns comprising N(2K−4) elements, of which N(K−2) elements correspond to remaining NK−2N complex symbols of said base block and N(K−2) elements correspond to conjugates of said remaining NK−2N complex symbols of said base block;

phase shifting said extended block, delivering a phase shifted extended block;

filtering said phase shifted extended block, delivering a block of N×(2K−1) filtered elements, referred to as a filtered block;

mapping the N×(2K−1) filtered elements of said filtered block on MK frequency samples, where M is a total number of carriers and M≥N; and transforming said MK frequency samples from a frequency domain to a time domain, delivering said multiple carrier signal.

* * * * *